United States Patent
Hansen

(10) Patent No.: US 6,457,734 B1
(45) Date of Patent: Oct. 1, 2002

(54) MULTIPURPOSE FRONT MOUNTED HITCH RECEIVER

(76) Inventor: Richard C. Hansen, 3943 N. Faraday, Boise, ID (US) 83713

( * ) Notice: Subject to any disclaimer, the term of this patent is extended or adjusted under 35 U.S.C. 154(b) by 0 days.

(21) Appl. No.: 09/919,261

(22) Filed: Jul. 30, 2001

Related U.S. Application Data

(63) Continuation-in-part of application No. 09/756,254, filed on Jan. 3, 2001.

(51) Int. Cl.⁷ .................................................. B60D 1/01
(52) U.S. Cl. ........................................ 280/481; 280/501
(58) Field of Search ......................... 280/481, 495–503

(56) References Cited

U.S. PATENT DOCUMENTS

| | | | |
|---|---|---|---|
| 2,880,016 A | 3/1959 | Peterson | 280/491 |
| 3,287,027 A | 11/1966 | Schuckman | 280/491 |
| 3,737,177 A | 6/1973 | Gal | 280/495 |
| 3,806,162 A | * 4/1974 | Milner | 280/502 |
| 4,714,265 A | * 12/1987 | Franklin | 280/491.4 |
| 4,869,521 A | 9/1989 | Johnson | 280/491.1 |
| 5,088,754 A | * 2/1992 | Skelton | 280/91.3 |
| 5,476,279 A | * 12/1995 | Klemesten | 280/495 |
| 5,636,885 A | 6/1997 | Hummel | 293/115 |
| 5,716,066 A | 2/1998 | Chou et al. | 280/501 |
| 5,727,806 A | * 3/1998 | McCoy et al. | 280/494 |

* cited by examiner

*Primary Examiner*—Anne Marie Boehler
*Assistant Examiner*—Matthew Luby
(74) *Attorney, Agent, or Firm*—Frank J. Dykas; Robert L. Shaver; Stephen M. Nipper

(57) ABSTRACT

A front receiver assembly for use with vehicles having front tow hooks. This front receiver assembly attaches to a vehicle's front tow hooks and can be mounted or dismounted quickly. This front hitch assembly is adaptable for use with nearly any hitch connector product.

15 Claims, 7 Drawing Sheets

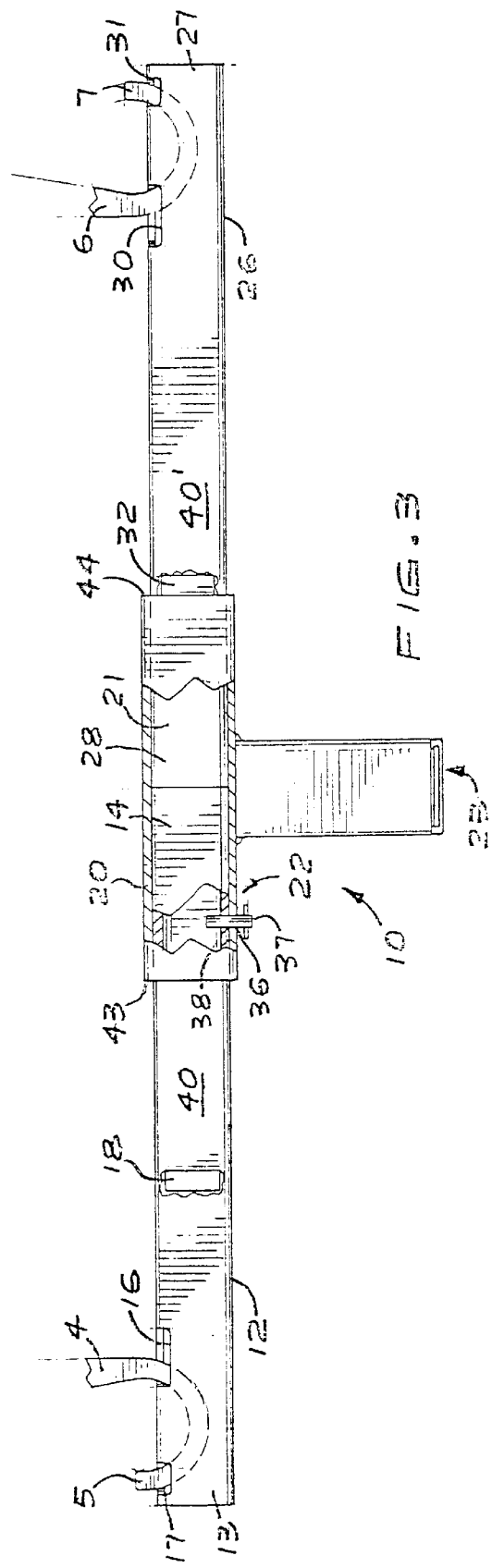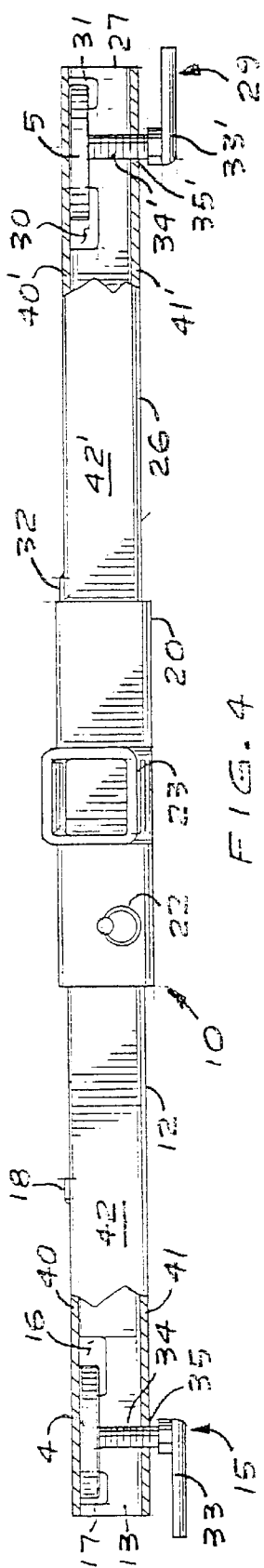

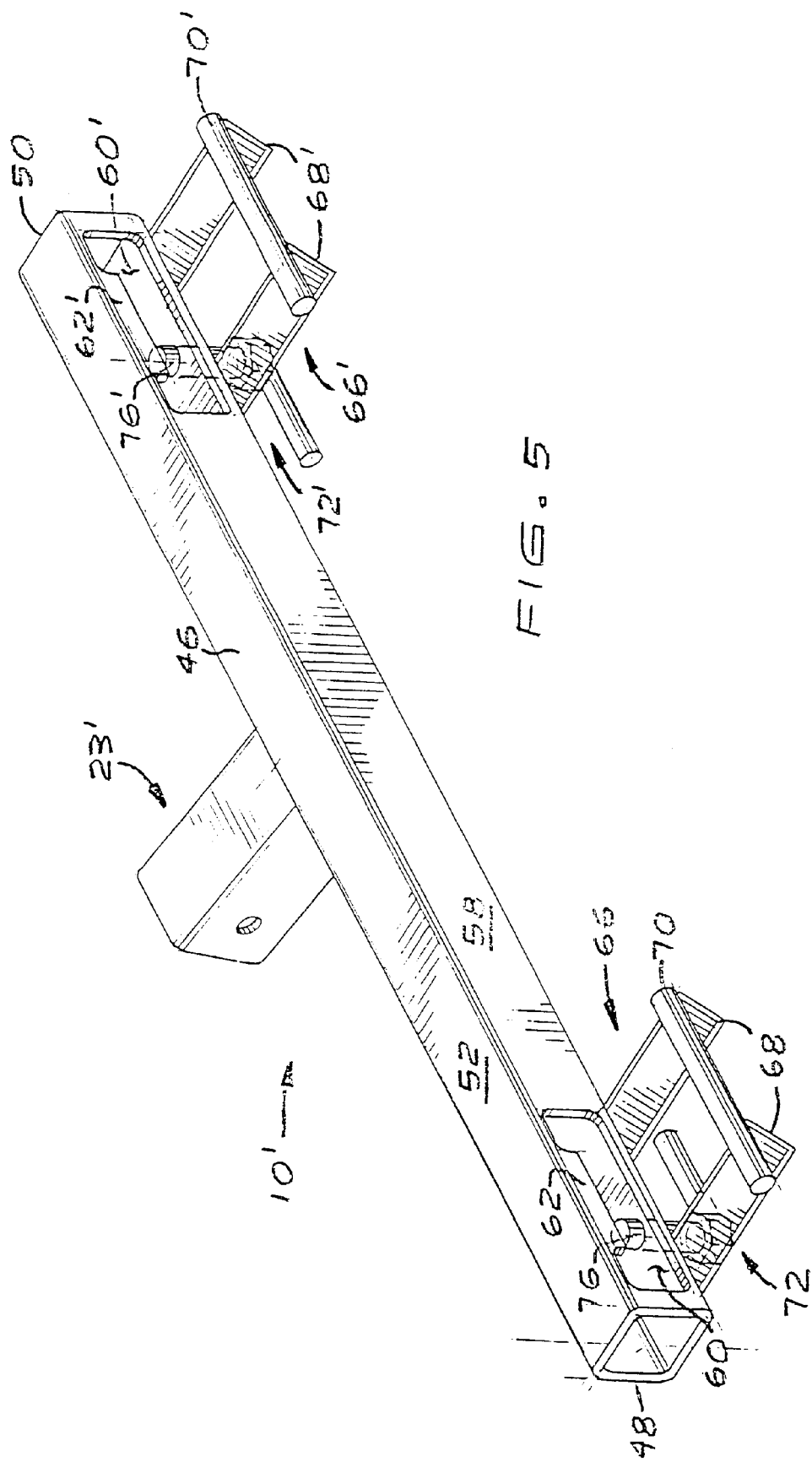

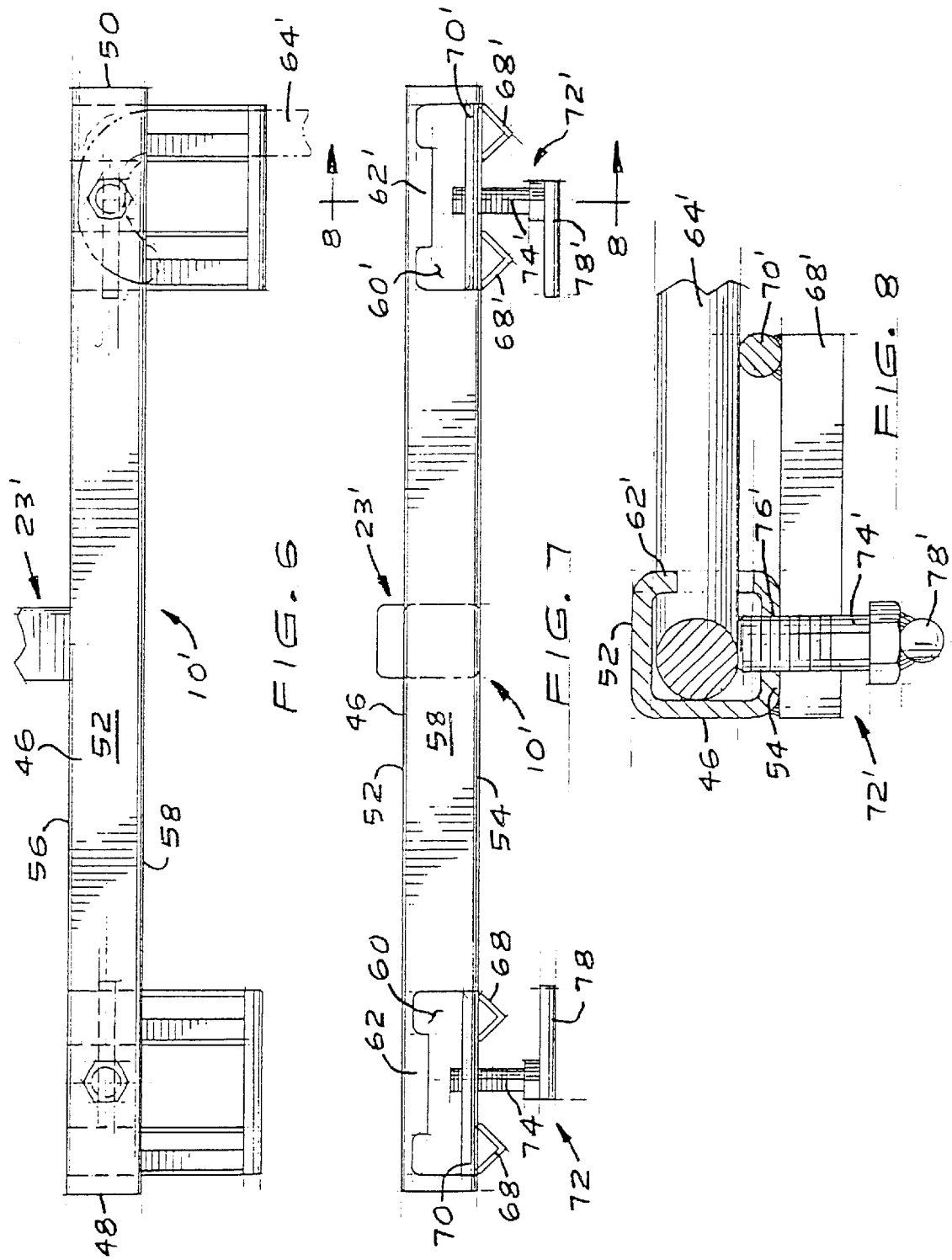

MULTIPURPOSE FRONT MOUNTED HITCH RECEIVER

PRIORITY

This application is a continuation-in-part of application Ser. No. 09/756,254 filed Jan. 3, 2001, the disclosure of which is incorporated by reference.

BACKGROUND OF THE INVENTION

1. Field of the Invention

The present invention generally relates to trailer hitches, and more particularly to removable, multipurpose receivers located on the front end of a vehicle.

2. Background Information

Many people use trailer hitch type assemblies for various purposes. Adaptations have been created for attachment of any number of devices to a vehicle through the use of a trailer hitch type receiver. Some of these uses include detachable bicycle racks, ski racks, surfboard racks, tables, chairs and umbrellas for tailgate parties, and even winches. In some cases a front receiver hitch would be required for use of these accessory attachments. This is the case when a rear trailer hitch receiver is being used to tow a travel trailer or other trailer. Other instances where the rear receiver cannot be used is when the vehicle is towing a fifth wheel type trailer, or it is covered by a pickup truck camper which extends rear of and below the truck bed.

In the case of front end winches, the use of a front receiver is highly desirable in that it enables the user to quickly and conveniently remove the winch assembly when not required, for example, when using the vehicle as primary transportation in town.

The most common usage of front receivers is holding a spotting hitch for backing a trailer or boat into a confined storage area. For most people, the task of moving a vehicle in reverse while maneuvering a trailer proves to be an extremely difficult and challenging procedure. If done improperly, the vehicle trailer combination will tend to jackknife, possibly leading to property damage and/or injury to persons. Most of this problem is caused by the fact that the person maneuvering the trailer is facing a direction different than which he or she is traveling. Thus, to compensate for the trailer moving to the left, the operator must turn the wheel to the right (and vice versa). For many people, this coordination is difficult.

Another disadvantage to maneuvering a trailer when it is attached to rear of a vehicle is that the user is typically located an entire vehicle length from the trailer. Particularly where the vehicle being maneuvered used is large, the vehicle operator attempting to maneuver the trailer may not be able to see the trailer or may have limited visibility through the vehicle's side mirrors during the maneuvering process.

What is needed is a method and/or device for use in maneuvering a trailer which allows the vehicle operator to face the trailer being maneuvered. What is also needed is a front-end receiver apparatus which is easy to install and uninstall on existing vehicles and adaptable for a multitude of uses.

SUMMARY OF THE INVENTION

The present invention is a front hitch type receiver assembly for use with vehicles having front tow hooks, including those having a generally horizontally oriented first tow hook, and a generally horizontally oriented second tow hook. This invention is envisioned for use on all vehicles which have front tow hooks, whether these tow hooks be vertical, horizontal or other. One embodiment of the invented front receiver assembly comprises an elongated first frame piece having a first end extending to a second end, with the first frame piece attaching to the first tow hook. It is preferred the first frame piece further comprise at least one locking means for locking the first frame piece on the first tow hook. The first frame piece second end is additionally able to attach to a center receiver. This center receiver is for attaching the first frame piece to a second frame piece. The center receiver is further able to cooperate with any appropriately sized connectors adapted for use with a trailer receptor. Such connectors include but are not limited to a trailer hitch assembly containing a trailer hitch ball, trailer hitch connector (for allowing the vehicle using the present invention to be towed by a second vehicle), a hitch mounted bicycle rack, a hitch mounted ski rack, winches, etc.

The elongated second frame piece has a first end extending to a second end. The second frame piece is able to attach to the second tow hook, and preferably has at least one locking means for locking the second frame piece on the second tow hook. The second frame piece second end is able to attach to the center receiver.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

BRIEF DESCRIPTION OF THE DRAWINGS

FIG. 3 is a top view of the embodiment of FIG. 2.

FIG. 4 is a front view of the embodiment of FIG. 2.

FIG. 5 is a perspective view of a third embodiment of the present invention.

FIG. 6 is a bottom view of the embodiment of FIG. 5.

FIG. 7 is a back view of the embodiment of FIG. 5.

FIG. 8 is a partial, cross-sectional view of the embodiment of FIG. 5.

DESCRIPTION OF THE PREFERRED EMBODIMENTS

Figure 1:
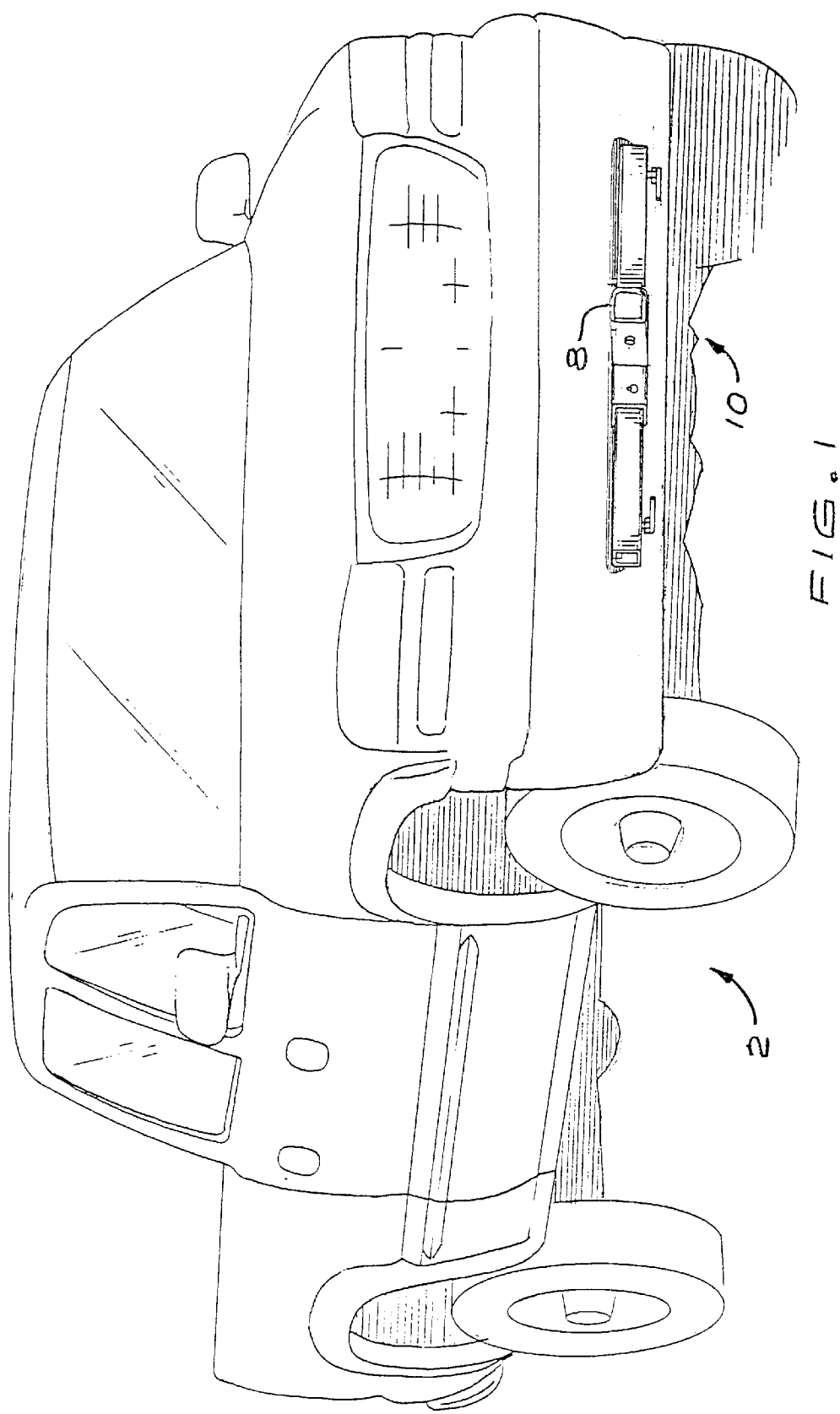
FIG. 1 is a perspective environmental view of one embodiment of the present invention shown installed on a pickup truck.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Referring initially to FIG. 1, a first embodiment of the invented front receiver assembly 10 is shown attached to the front of a vehicle 2. It is preferred that a receiver hitch type connector 8 be used with the invented front hitch receiver assembly 10 so that the front of the vehicle, through using the present invention, may be used to attach a wide variety of various attachment assemblies that are already available in the existing market, including common hitch balls, bicycle racks, ski racks, surfboard holders, power winches, etc. However it should be readily apparent that other appropriately adapted connectors are available, including, but not limited to, collar and clam shell type hitches, plate and pin connectors, and basic plate and bolt hole connectors. Accordingly, while this specification describes a square tube box type receiver, the term 'receiver' as it is used in this specification, and the appended claims, is specifically defined to mean any type of structure which may be used to attach an accessory, whether the accessory is a simple hitch ball or any other accessory, to a vehicle. The reason why it is the square tube box type receiver that is described in the specification is because it is the preferred embodiment and one of the most common structures used as a receiver.

The vehicle 2 shown in FIG. 1 has a first tow hook having a first tow hook point (not shown) and a second tow hook having a second tow hook point (not shown). These hooks are commonly horizontal in orientation in relation to the vehicle and are commonly found on standard makes and models of many trucks, SUV's, and passenger vehicles.

As shown in FIG. 1, the present invention is a front hitch assembly which attaches to the front tow hooks of a vehicle, thereby allowing an accessory to be attached to the assembly.

Figure 2:
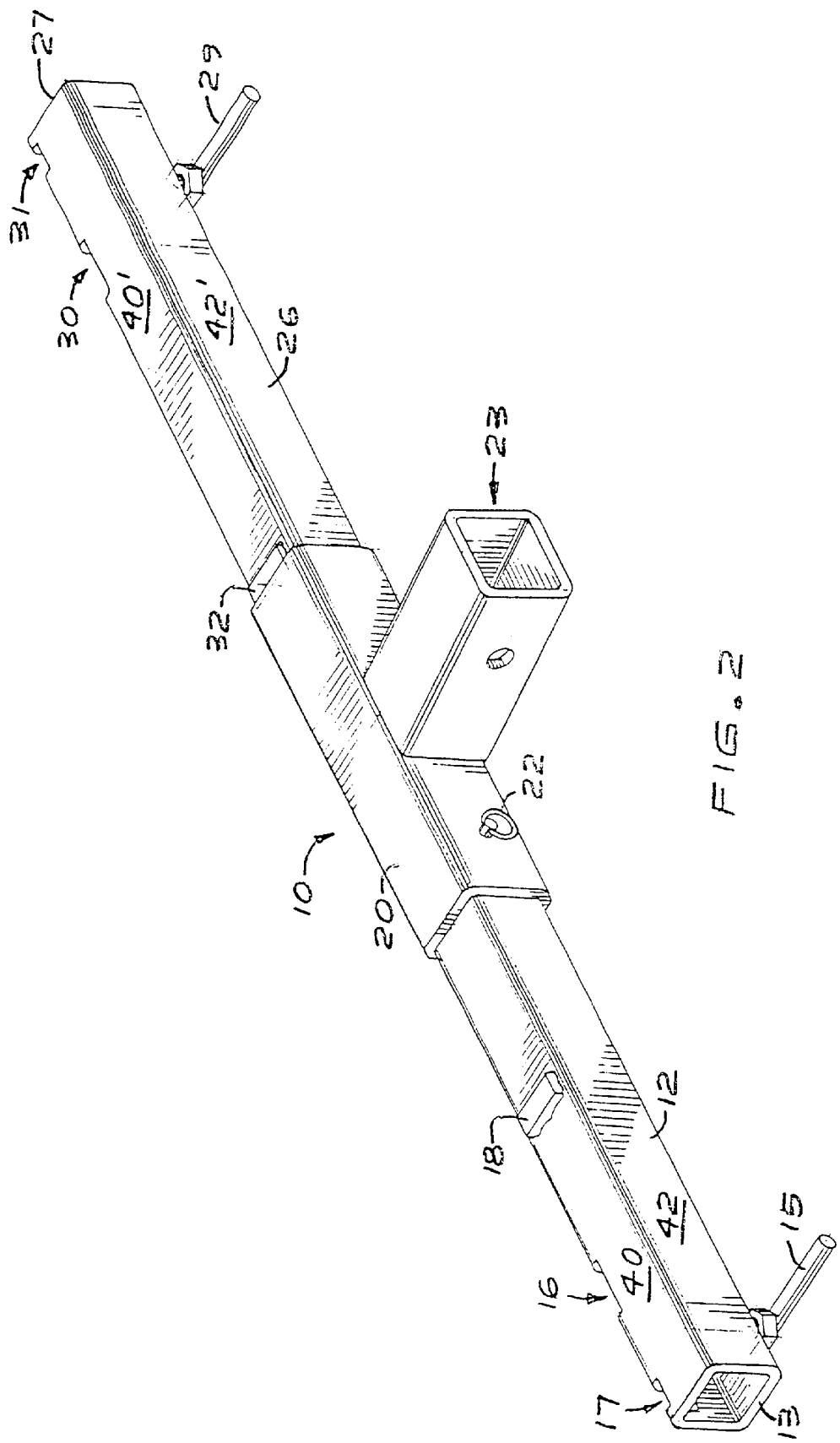
FIG. 2 is a perspective view of a second embodiment of the present invention.

Referring now to FIG. 2, a second embodiment of the present invention is shown. This second embodiment of the front hitch assembly 10, shows a first frame piece 12, a center receiver 20, and a second frame piece 26. The first frame piece 12 is an elongated piece having a first end 13 extending to a second end 14 (shown in FIG. 3). This embodiment preferably uses a square, metal, tubular first frame piece 12 and second frame piece 26, however other shapes and forms of first frame pieces and second frame pieces are also envisioned. The first frame piece 12 has a top side 40 opposite a bottom side and a front side 42 opposite a back side.

The first frame piece 12 preferably has an entrance slot 16 for receiving a vehicle first hook point therethrough (as shown in FIG. 3). The first frame piece 12 additionally has an exit slot 17 for allowing the first vehicle hook point to exit the first frame piece 12. It is preferred that the exit slot 17 be located nearer the first end 13 than the entrance slot 16 is, however, depending upon the orientation and curvature of the vehicle's tow hook, the slots (16, 17) may be located accordingly, or as necessary within the frame piece 12. It is preferred that these slots 16, 17 be located in or near the junction between the top side 40 and back side.

The first frame piece 12 preferably also comprises a first frame piece locking means 15 which is utilized to lock the first frame piece 12 upon the first tow hook 4 when the first tow hook 4 is inserted through the entrance slot 16 and out the exit slot 17. This locking means 15 can comprise any means of locking the first frame piece 12 upon the tow hook 4, however, the preferred method of locking the first frame piece 12 against the first tow hook 4 is shown in FIG. 4. FIG. 4 shows the first frame piece locking means 15 comprising a bolt 34, which extends through a threaded hole 35 located within the bottom side 41 of the first frame piece 12. Thus, this bolt 34 is able to be tightened against the first tow hook 4 thereby pressing the first tow hook 4 against the top 40 of the first frame piece 12. It is preferred that this bolt 34 further comprise a handle 33 for allowing the user to tighten the bolt 34 against the hook 4 by hand.

Referring back to FIG. 2, in this embodiment it is preferred that a center receiver connection stop 18 be located on the first frame piece 12. Likewise, it is preferred that a similar center receiver connection stop 32 be located on the second frame piece 26. These connection stops 18, 32 serve to inhibit lateral movement of the center receiver 20 upon the frame pieces 12 and 26. As can be seen in this figure, it is preferred that the center receiver connection stop 18 be located far enough in (offset) on the first frame piece 12 so that the center receiver 20 can completely be slid onto the first frame piece 12. This would allow the user to attach both the first frame piece 12 and the second frame piece 26 respectively upon the first tow hook 4 and second tow hook 6, bring the second ends 14, 28 of the frame pieces 12, 26 together, and then slide the center receiver 20 from fully on the first frame piece 12 to a position where the center receiver 20 is half on the first frame piece 12 and half on the second frame piece 26, as shown in FIGS. 2–4. When in this position, the center receiver 20 could be locked onto the first and second frame pieces 12, 26 through use of a locking means 22. As seen in FIG. 3, this locking means 22 comprises a self locking release pin 37 which is able to extend through a hole 36 located in the center receiver 20 and in through a hole 38 located in the front side 42 of the first frame piece 12. Likewise, it is also envisioned that the center/receiver connection stop 32 could be offset rather than stop 18 and/or the locking means 22 could be located on the second frame piece.

The second frame piece 26 preferably has an entrance slot 30 for receiving a vehicle second hook point therethrough (as shown in FIG. 3). The second frame piece 26 additionally has an exit slot 31 for allowing the second vehicle hook point 7 to exit the second frame piece 26. It is preferred that the exit slot 31 be located nearer the first end 27 than the entrance slot 30 is, however, depending upon the orientation and curvature of the vehicle's tow hook, the slots (30, 31) may be located accordingly, or as necessary within the frame piece 26. It is preferred that these slots 30, 31 be located in or near the junction between the top side 40' and back side.

The second frame piece 26 preferably also comprises a second frame piece locking means 29 which is utilized to lock the second frame piece 26 upon the second tow hook 6 when the second tow hook 6 is inserted through the entrance slot 30 and out the exit slot 31. This locking means 29 can comprise any means of locking the second frame piece 26 upon the tow hook 6, however, the preferred method of locking the first frame piece 26 against the first tow hook 6 in this embodiment is shown in FIG. 4. FIG. 4 shows the first frame piece locking means 29 comprising a bolt 34', which extends through a threaded hole 35' located within the bottom side 41' of the second frame piece 26. Thus, this bolt 34' is able to be tightened against the second tow hook 6 thereby pressing the second tow hook 6 against the top 40' of the second frame piece 26. It is preferred that this bolt 34' further comprise a handle 33' for allowing the user to tighten the bolt 34' against the hook 6 by hand.

Referring again to FIG. 2, the center receiver 20 has a trailer hitch connector 23 for receiving a standard trailer hitch assembly 8 (as shown in FIG. 1). Referring now to FIG. 3, the center receiver 20 has a center receiver frame channel 21 extending therethrough from a center receiver first end 43 and a center receiver second end 44. This channel 21 is able to receive therein the second end 14 of the first frame piece 12, as well as the second end 28 of the second frame piece 26. In such a manner, the center receiver 20 is able to slide along the frame piece 12, 26 until the center receiver 20 contacts one of the center receiver connection stops 18, 32. Other means of attaching the second end 14 of the first frame piece 12 in relation to the second end 28 of the second frame piece 26 are also envisioned.

In use (the embodiment shown in FIGS. 2–4), a user would start with either the first frame piece or the second frame piece. For the sake of this discussion, we will assume that the user prefers to attach the first frame piece first. In use, the user would take the first frame piece 12 and insert the first tow hook point 5 into the entrance slot 16. The user would then rotate the first frame piece 12 around so that the first tow hook point 5 would extend out of the exit slot 17 (as shown in FIG. 3). Likewise, the user would do the same for the second frame piece, with the second tow hook point 7 extending into the entrance slot 30 and out of the exit slot 31. In such a fashion, the second end 14 of the first frame piece would be generally adjacent to the second end 28 of the second frame piece.

At this point or earlier, the user would insert the second end 14 of the first frame piece 12 into the center receiver 20 frame channel 21. The user would slide the center receiver 20 onto the first frame piece 12 so that the center receiver 20 contacts the center receiver connection stop 18. At this point, the center receiver second end 44 would generally be inwards or equal to the second end 14 of the first frame piece 12 so that the first frame piece 12. The second frame piece 26 could then be rotated and oriented next to the first frame piece 12 where the second end of the first frame piece and the second end of the second frame piece would be adjacent to one another. The center receiver 20 could then be slid so that the second end of the second frame piece is able to be inserted into the opening entering into the center receiver frame channel 21 which exists in the center receiver second end 44. This thereby would lock the center receiver onto the first frame piece and/or second frame piece. Additionally, locking means 22 could be used to lock the center receiver on the first frame piece and the second frame piece. At this point, the first frame piece locking means 15 and the second frame piece locking means 29 could be tightened down thereby fixedly holding the orientation of the first frame piece and second frame piece so that the trailer hitch ball connector 23 would be held appropriately in line to receive trailer hitch ball assembly 8, as shown in FIG. 4. While this discussion discusses one means of using this embodiment of the present invention and assembling it, other orders are also possible as long as in the end, the desired arrangement is arrived at.

A third embodiment is shown in FIG. 5. This third embodiment of the front hitch assembly 10' consists chiefly of a main frame piece 46. The main frame piece 46 is an elongated piece having a first end 48 extending to a second end 50. This embodiment preferably uses a square, metal, tubular main frame piece 46, however other shapes and forms of main frame pieces are also envisioned. The main frame piece 46 has a top side 52 opposite a bottom side 54 (shown in FIG. 7) and a front side 56 (shown in FIG. 6) opposite a back side 58. In use, the front side 56 faces the object being towed, and the back side 58 faces the towing vehicle.

The main frame piece 46 preferably has a pair of hook receiving slots 60/60' for respectively receiving a vehicle's first and second tow hooks. These slots 60/60' are preferably located in the back side 58 and are spaced apart generally the same distance the vehicle's tow hooks are spaced apart. It is preferred that these slots 60/60' be located, respectively, near the first end 48 and the second end 50, however, depending upon the orientation and curvature of the vehicle's tow hook, the slots may be located accordingly.

The main frame piece 46 preferably additionally has a first tang 62 and a second tang 62'. These tangs 62/62' are for inhibiting movement of the tow hooks when the assembly 10' is installed thereon. It is preferred that these tangs 62/62' extend downwards from the top side 52 along the back side 58, preferably centered within the slots 60160' as shown in FIGS. 5 and 7. These tangs have a width less than the inside diameter of the curvature of the tow hook so that, as shown in FIG. 6, the tow hook 64/64' may extend through the slot 60/60' into the frame piece 46, with the point of the tow hook extending back out of the frame piece 46 and the tang 62/62' may reside between the inside diameter of the curvature of the tow hook (again, as shown in FIG. 6).

Referring again to FIG. 5, preferably extending from the main frame piece 46 are bracing means 66/66' for supporting the assembly 10' when installed on the vehicle. In this embodiment, these bracing means 66/66' comprise flanges 68/68' which extend outwards to a cross piece 70/70'. In use, the tow hook 64/64' would rest upon the cross piece 70/70', as shown in FIG. 6 and FIG. 8. When an attachment to the assembly 10' via the central receiver 23', exerts a downward force of the weight of the trailer on the hitch connector 23' causes the cross piece 70/70' to be slightly be forced upwards and against the underside of the tow hook 64/64', using the hooks' attachment to the main frame piece 46 as a fulcrum, thereby locking the assembly 10' upon the hook (s).

Referring now to FIG. 6, the tow hooks 64/64' are preferably able to be attached to the main frame piece 46 through use of at least one locking means 72/72'. These locking means 72/72' are utilized to lock the main frame piece 46 upon the tow hooks 64/64' when the tow hooks are inserted into the hook receiving slot 60/60'. This locking means 72/72' can comprise any means of locking the main frame piece 46 upon the tow hooks, however, the preferred method of locking the main frame piece 46 against the tow hooks is shown in FIG. 8.

FIG. 8 shows the main frame piece locking means 72' (72) comprising a bolt 74' (74), which extends through a threaded hole 76' (76) located within the bottom side 54 of the main frame piece 46. Thus, this bolt 74' (74) is able to be tightened against the underside of the tow hook 64' (64) thereby pressing the tow hook against the top 52 of the main frame piece 46 and fixedly holding the tow hook within the main frame piece 46. It is preferred that this bolt 74' (74) further comprise a handle 78' (78) for allowing the user to tighten the bolt 74' (74) against the tow hook 64' (64) by hand.

In use (the embodiment shown in FIGS. 5–8), a user would merely hold the assembly 10' with the top side 52 facing upwards. The user would then place the assembly 10' on the tow hooks by sliding the hook receiving slot 60 on the driver's side tow hook 64, and sliding the hook receiving slot 60' on the passenger's side tow hook 64'. The flanges 68/68' would then drop into the curvature of the hook 64/64' and the cross piece 70/70' would be generally below the hooks 64/64'. The user would then be able to operate one or both of the locking means 72/72' to thereby fixedly hold the main frame piece 46 so that the trailer hitch ball connector 23 would be held appropriately in line to receive trailer hitch ball assembly 8, as shown in FIGS. 1 and 5

Depending upon the make and model of the vehicle and the application for which the front receiver assembly is to be used a variety of other embodiments of the invention may utilized.

Figure 9:
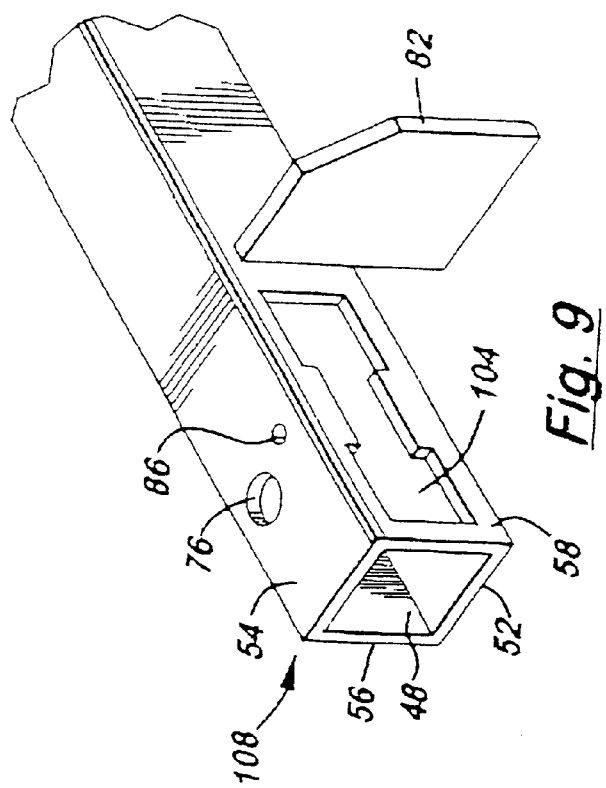
FIG. 9 is a partial reverse perspective view of the hook receiving area and a vehicle brace of a fourth embodiment.

Referring now to FIG. 9, shown is a tab style brace 82 positioned along the back side of the main frame piece 58 next to an entrance slot 104 located near the first end of the elongated frame piece 48. This brace 82 prevents the rotation of the main frame piece along its longitudinal axis by, compressingly engaging the brace against the vehicle when a downward force is placed upon the assembly. A similar brace would be found at the second end of the main frame piece, and as many of these tab style braces as are desired may be utilized along the length of the main frame piece 46.

In order for the main frame piece to be attached to the vehicle, the tow hooks and the main frame piece must become attached. In the previously discussed embodiments, the frame was attached to the tow hooks by means of entrance slots and locking means. It is to be understood that in separating the attachment means from the main frame piece those same objects and advantages previously discussed in regard to attachment apply.

Each attachment device 108 comprises a means for attaching the receiver to a tow hook by the use of a locking means. The attachment device 108 has an entrance slot 104 located within the back side 58 of the attachment means configured for receiving a tow hook. A threaded hole 76 for interaction with a threaded bolt locking means is positioned in the top surface of the attachment means and allows for the locking bolt to be compressed against the tow hook. A pass through chamber 86 allows a clevis pin to be inserted through the one side of the attachment device, pass through the attachment device, and exit through the opposite side of the attachment device, thus further locking the tow hook into the attachment device when the clevis pin is held in place by a keeper key.

Figure 10:
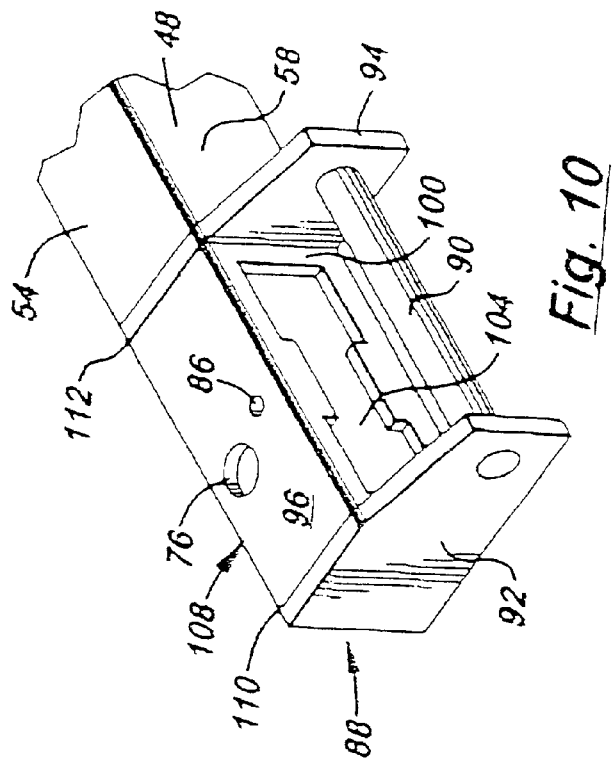
FIG. 10 is a partial reverse perspective view of the hook receiving area and a vehicle brace of a fifth embodiment.

Referring now to FIG. 10, shown is another embodiment of a bracing means and a separate attachment means. In this embodiment a first bracing flange 94 is able to be connected to the first end of a main frame piece 48 and a second end of an attachment device 112 and extends outward away from the backside of the main frame piece 58. The attachment device 108 is connected at its first end 110 to a first side-flange 92, and extends to a second end that is connected to a first bracing flange 94. This first bracing flange 94 is also connected on its second side to the first end of the main frame piece 48.

The portion of the attachment device between the first and second end comprises an entrance slot 104. Preferably, a cross bar 90, or other means, is proportionately dimensioned to allow access for a tow hook into the entrance slot 104 for connecting the first side-flange 92 and the first bracing flange 94. In use, when a force is placed on center receiver the main frame piece attempts to pivot using the tow hook as a fulcrum. In this embodiment the cross bar acts as a second fulcrum in the opposite direction as the pivoting force on the tow hook creating a counter force to stabilize the main frame piece and prevent rotation along the longitudinal axis of the main frame piece.

In this embodiment the attachment device 108 and the main frame piece 46 are oriented so as to be in the same planes both horizontally and vertically. It is to be understood that this is not required. In alternate variations, the attachment device 108 and the main frame piece 46 may be offset in a variety of planes so as to allow access between the vehicles tow hooks and the entry slot of the attachment device 104.

Figure 11:
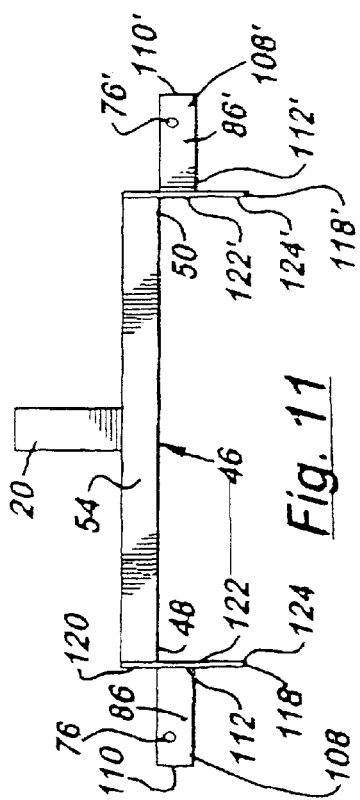
FIG. 11 is a bottom view of a sixth embodiment of the present invention.

Referring now to FIG. 11, shown is a bottom view of an embodiment of the present invention adapted for a vehicle with recessed tow hooks or an extension in the front of a vehicle. In this embodiment, the main frame piece 46 has a first bracing flange 118 connected to the first end of the main frame piece 48 and a second bracing flange 118' connected to the second end of the main frame piece 50. A first attachment device 108 is attached to the first bracing flange 118 in such a position whereby access to both the tow hooks and the front receiver are possible. A second attachment device 108' is attached to the second bracing flange 118' in a similarly located position on the second end of the main frame piece position so as to allow access to both the tow hooks and the front receiver. The location of the attachment devices and the main frame piece are offset.

Figure 12:
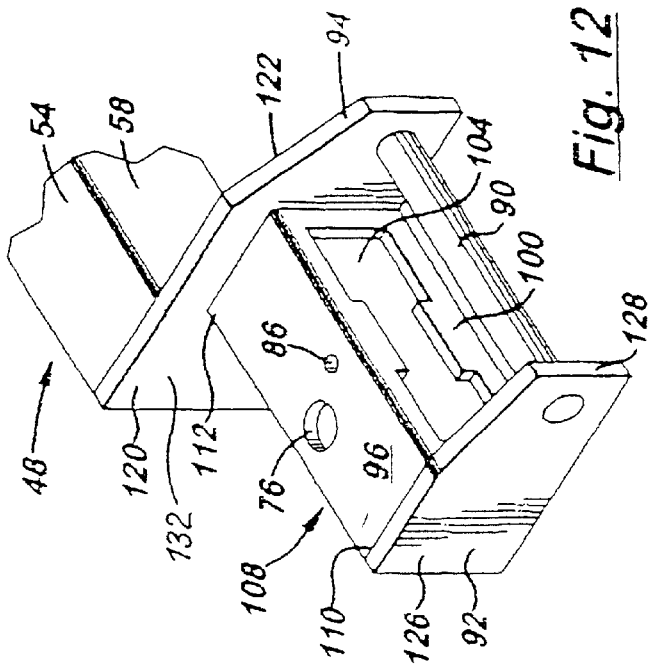
FIG. 12 is a partial perspective of the embodiment of FIG. 11.

In FIG. 12, shown is another embodiment of an attachment device showing a crossbar bracing means in an offset position. In this embodiment, a first bracing flange 94 is connected to the first end of a main frame piece 48 and a second end of an attachment device 112 and extends outward away from the backside of the main frame piece 58. The attachment device 108 is connected at its first end 110 to a first side-flange 92, and extends to a second end 112 that is connected to a first bracing flange 94. This first bracing flange 94 is also connected on its second side 132 to the first end of the main frame piece 48. The portion of the attachment device between the first and second end defines an entrance slot 104. A cross bar 90 proportionately dimensioned to allow access for a tow hook into the entrance slot 104 connects the first side-flange 92 and the first bracing flange 94. When a force is placed on center receiver the main frame piece attempts to pivot using the tow hook as a fulcrum. In this embodiment the cross bar acts as a second fulcrum in the opposite direction as the pivoting force on the tow hook creating a counter force to stabilize the main frame piece and prevent rotation along the longitudinal axis of the main frame piece.

In securing the attachment means to a tow hook a variety of locking means can be used. Referring again to FIG. 10, shown is a threaded hole 76 configured to accept a threaded bolt for compression on to said tow hooks. Ideally such bolts would have handles affixed to the non-engaging ends of the bolts so as to allow the bolts to be tightened or loosened without the use of tools. Shown is also a pass through hole 86 adapted for a clevis pin (not shown) whereby such pin can inserted through a channel formed by a pair of holes in opposite sides of an attachment means 86 and held in place by a keeper pin. Such a clevis pin, threaded bolt combination would be the best way of securely attaching an attachment device to a tow hook.

Figure 13:
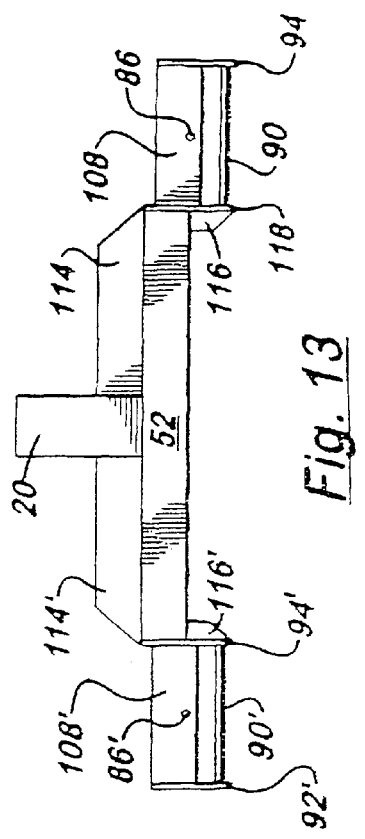
FIG. 13 is a top view of the embodiment of FIG. 11.

In FIG. 13, shown is another embodiment of the invention further including a receiver reinforcing means comprising at least one stiffener bar 114, and a pair of reinforcing tabs 116. The stiffener bar 114 extends along the front portion of the main frame piece and perpendicularly abuts the main frame receiver 20 in such a way so as to support the main frame central receiver when an attachment is added. In a preferred embodiment a pair of matching stiffener plates 114, 114' extend from the first and second ends of the main frame piece 48, 50 along the front side of the main frame piece 56 and abut the center receiver. 20

In embodiments where the attachment devices are offset from the main frame piece, the center receiver a pair of reinforcing tabs 116, 116' are attached to the junction of the bracing flanges and the main frame piece along the backside of the main frame piece 58.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A front receiver assembly configured for attachment to vehicles having first and second front tow hooks, said front receiver assembly comprising:

an elongated first frame piece having first and second ends;

a first attachment means configured for releaseable attachment with the first end of the first frame piece to the first front tow hook and configurable for extending the second end in the direction of the second front tow hook;

an elongated second frame piece having first and second ends;

a second attachment means configured for releasably attaching the second end of the second frame piece to the second front tow hook and configurable for extending the first end of the second frame piece toward the second end of the first frame piece;

a center receiver assembly configured to interconnect between the second end of the first frame piece and the first end of the second frame piece, said center receiver assembly further having an attachment receiver for receiving and holding an attachment assembly; and means for attaching said center receiver assembly to the first and second frame pieces.

2. The front receiver assembly of claim 1, wherein the center receiver assembly further comprises a center receiver frame channel configured to receive in interfitting, slideable relationship the second end of the first frame piece and the first end of the second frame piece.

3. The front receiver assembly of claim 2, wherein said first frame piece further comprises a center receiver connection stop for stopping the lateral movement of the center receiver assembly onto the first frame piece at a point wherein the center receiver assembly is not engaged with the second frame piece.

4. The front receiver assembly of claim 2, wherein said second frame piece further comprises a center receiver connection stop for stopping the lateral movement of the center receiver onto the second frame piece at a pre-selected position wherein said center receiver assembly is engaged with both the second end of the first frame piece and the first end of the second frame piece.

5. The front receiver assembly of claim 4, wherein said first frame piece further comprises a center receiver connection stop for stopping the lateral movement of the center receiver assembly onto the first frame piece at a point wherein the center receiver assembly is not engaged with the second frame piece.

6. The front receiver assembly of claim 2 which further comprises locking means for locking at least one of said frame pieces within said frame channel at a pre-selected position wherein said center receiver assembly is engaged with both the second end of the first frame piece and the first end of the second frame piece.

7. The front receiver assembly of claim 1 wherein the attachment means for releasably attaching the first frame piece to the first tow hook and the second frame piece to the second tow hook each further comprises an engagement slot formed in the first end of the first frame piece for receiving a hook therethrough, and an engagement slot formed in the second end of the second frame piece for receiving a hook therethrough.

8. A front receiver assembly for use with vehicles having first and second front tow hooks, said front receiver assembly comprising:

an elongated first frame piece having first and second ends, and a center receiver connection stop for stopping the lateral movement of a center receiver assembly onto the first frame piece at a point wherein the center receiver assembly is not engaged with a second frame piece, said first frame piece having an engagement slot formed in the first end of the first frame piece for receiving a hook therethrough and releasably attaching the first end of the first frame piece to the first front tow hook with the second end of the first frame piece extending in the direction of the second front tow hook;

an elongated second frame piece having first and second ends, and a center receiver connection stop for stopping the lateral movement of a center receiver assembly onto the second frame piece at a pre-selected position wherein said center receiver assembly is engaged with both the second end of the first frame piece and the first end of the second frame piece, said second frame piece having an engagement slot formed in the second end of the second frame piece for receiving a hook therethrough and releasably attaching the second end of the second frame piece to the second front tow hook with the first end of the second frame piece extending toward the second end of the first frame piece;

a center receiver assembly having an attachment receiver for receiving and holding an attachment assembly and a center receiver frame channel configured to receive in interfitting, slideable relationship the second end of the first frame piece and the first end of the second frame piece; and a locking means for locking at least one of said frame pieces within said frame channel at a pre-selected position wherein said center receiver assembly is engaged with both the second end of the first frame piece and the first end of the second frame piece.

9. A front receiver assembly configured to attach to the front tow hooks of a vehicle having first and second front tow hooks, each front tow hook defining a hook eye, said front receiver assembly comprising:

an elongated frame piece having first and second ends and a longitudinal axis therebetween, each of said ends configured to engage a front tow hook in a manner whereby a portion of said frame piece is within said hook eye;

means for locking at least one end of the frame piece within an eye of a hook; and at least one receiver attached to said frame piece for cooperation with an appropriately dimensioned attachment assembly.

10. The front receiver assembly of claim 9 further comprising a bracing means attached to said frame piece and configured for engagement with the vehicle when a downward force is applied to the receiver for limiting rotational movement of the frame piece about its longitudinal axis.

11. A front receiver assembly for use with a vehicle having first and second front tow hooks, with each front tow hook defining a hook eye, said front receiver assembly comprising:

an elongated frame piece having first and second ends and a longitudinal axis therebetween;

means for attaching the frame piece to said first and second tow hooks;

means for locking at least one end of the frame piece within an eye of a hook;

at least one receiver attached to said frame piece for cooperation with an appropriately dimensioned attachment assembly; and means for bracing attached to said frame piece and configured for compressive engagement with the vehicle when a downward force is applied to the receiver for limiting rotational movement of the frame piece about its longitudinal axis.

12. The front receiver assembly of claim 11 wherein said means for attachment comprise:

a first attachment device having a central portion defined by a first end extending to a second end, and an engagement slot formed in said central portion for receiving a hook therethrough and releasably attaching the first attachment device to a first tow hook; and a second attachment device having a central portion defined by a first end extending to a second end, and an engagement slot formed in said central portion for receiving a hook therethrough and releasably attaching the second attachment device to a second tow hook.

13. The front receiver assembly of claim 11 wherein said means for bracing further comprises:

a pair of bracing flanges attached to and extending out from the elongated frame piece in juxtaposed relationship; and a cross brace attached to, and interconnecting the bracing flanges, said cross brace configured for engagement with the vehicle, when a downward force is applied to the receiver, for limiting rotational movement of the frame piece about its longitudinal axis.

14. A front receiver assembly for use with vehicles having first and second front tow hooks, said front receiver assembly comprising:

an elongated first frame piece having first and second ends and a center receiver connection stop for stopping the lateral movement of a center receiver assembly onto said first frame piece at a point wherein the center receiver assembly is not engaged with a second frame piece;

attachment means for releasably attaching the first end of the first frame piece to the first front tow hook and configurable for extending the second end in the direction of the second front tow hook.

an elongated second frame piece having first and second ends and a center receiver connection stop for stopping the lateral movement of the center receiver onto the second frame piece at a pre-selected position wherein said center receiver assembly is engaged with both the second end of the first frame piece and the first end of the second frame piece;

attachment means for releasably attaching the second end of the second frame piece to the second front tow hook and configurable for extending the first end of the second frame piece toward the second end of the first frame piece;

a center receiver assembly having a center receiver frame channel configured to receive in interfitting, slideable relationship the second end of the first frame piece and the first end of the second frame piece and an attachment receiver for receiving and holding an attachment assembly; and locking means for locking at least one of said frame pieces within said frame channel at a pre-selected position wherein said center receiver assembly is engaged with both the second end of the first frame piece and the first end of the second frame piece.

15. A front receiver assembly for use with vehicles having first and second front tow hooks, said front receiver assembly comprising:

an elongated first frame piece having first and second ends and an engagement slot for receiving a hook therethrough;

attachment means for releasably attaching the first end of the first frame piece to the first front tow hook and configurable for extending the second end in the direction of the second front tow hook;

an elongated second frame piece having first and second ends and an engagement slot for receiving a hook therethrough;

attachment means for releasably attaching the second end of the second frame piece to the second front tow hook and configurable for extending the first end of the second frame piece toward the second end of the first frame piece;

a center receiver assembly configured to interconnect between the second end of the first frame piece and the first end of the second frame piece, said center receiver assembly further having an attachment receiver for receiving and holding an attachment assembly; and means for attaching said center receiver assembly to the first and second frame pieces.

* * * * *